United States Patent [19]

Janecke et al.

[11] Patent Number: 4,774,976

[45] Date of Patent: Oct. 4, 1988

[54] MODULATING HYDRAULIC PRESSURE CONTROL VALVE AND ASSEMBLY METHOD THEREFOR

[75] Inventors: James P. Janecke, Waukesha; Ronald C. Koltz, Hartland, both of Wis.

[73] Assignee: Applied Power Inc., Butler, Wis.

[21] Appl. No.: 100,330

[22] Filed: Sep. 23, 1987

[51] Int. Cl.$^4$ .......................................... G05D 16/00
[52] U.S. Cl. ....................................... 137/14; 137/82; 137/624.15; 137/15; 251/129.08
[58] Field of Search ................ 137/82, 624.13, 624.15, 137/1, 14, 15; 251/129.08; 335/219, 220

[56] References Cited

U.S. PATENT DOCUMENTS

| | | | |
|---|---|---|---|
| 3,861,643 | 1/1975 | Moffatt | 251/129.08 |
| 3,926,405 | 12/1975 | Arnold | 251/129.08 |
| 4,108,420 | 8/1978 | West | 251/129.08 |
| 4,538,644 | 9/1985 | Knutson et al. | 137/625.64 |
| 4,576,200 | 3/1986 | Janecke et al. | 137/624.13 |

*Primary Examiner*—Alan Cohan
*Attorney, Agent, or Firm*—John C. Cooper, III; C. Thomas Sylke; Fred Wiviott

[57] ABSTRACT

A hydraulic pressure control valve includes a modulator-controlled solenoid assembly which selectively axially displaces a disc armature adjacent thereto. When not attracted by the solenoid, the armature is biased away from the solenoid by a wave spring. Movement of the armature opens and closes the outlet of a lower body member to a source of hydraulic fluid under pressure. The armature is improved, having dimples on the face adjacent the solenoid assembly to minimize sticking. Additionally, the center pole of the solenoid is axially adjustable and can therefore be set for different valve performance levels. Assembly of the valve is quickly accomplished using pneumatic pressure under performance conditions for adjustment of and setting the initial displacement of the disc armature. Setting is accomplished by crimping the various components in an outer tube.

26 Claims, 2 Drawing Sheets

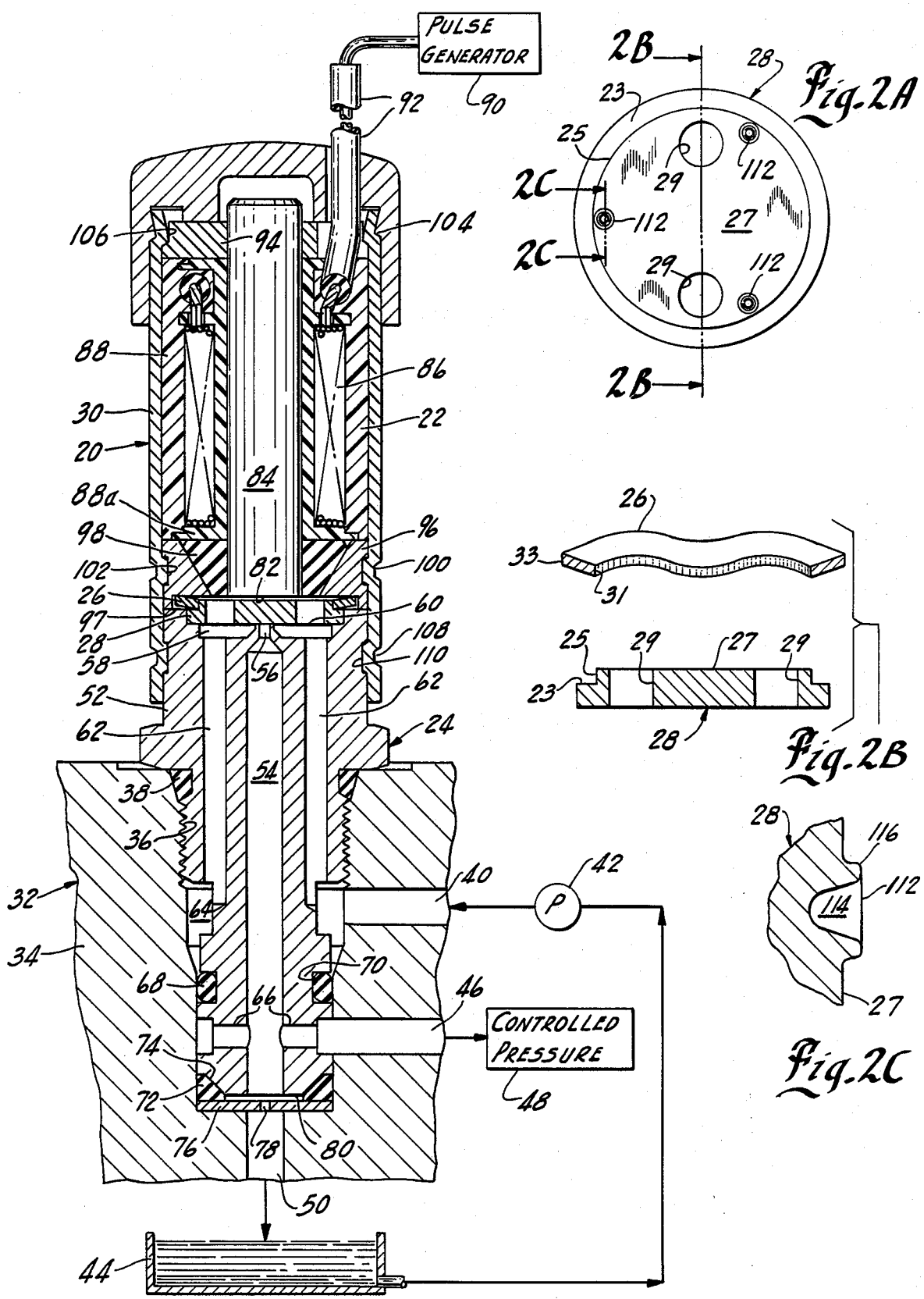
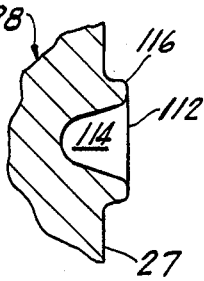

MODULATING HYDRAULIC PRESSURE CONTROL VALVE AND ASSEMBLY METHOD THEREFOR

BACKGROUND OF THE INVENTION

1. Field of the Invention

The present invention relates generally to the art of hydraulic pressure control valves and methods for assembling the same. More specifically, the present invention relates to an improved hydraulic modulated pressure control valve, used in connection with a device requiring a controlled pressure, wherein the mechanism by which the inflow of hydraulic fluid is modulated to more faithfully transmit the pulses of the control mechanism to the controlled pressure device. Additionally, the solenoid of the improved valve is adjustable to provide varying performance standards. Finally, a method for assembling the improved valve is shown.

2. Description of Related Areas of Art

Modulating pressure control valves are well known in the hydraulic valve art. A good example of such a valve is shown in U.S. Pat. No. 4,538,644 entitled "Pressure Regulator" issued to Knutson, et al on Sept. 3, 1985. In the preferred embodiment of that invention shown in FIG. 1, a modulator 24 controls the access of hydraulic fluid to the cylinder 60. The plunger 54 reduces and increases the clearance through orifice 48 to thereby control pressure in chamber 16.

Another similar valve is shown in U.S. Pat. No. 4,576,200 entitled "Hydraulic Pressure Reducing Control Valve" issued to Janecke, et al on Mar. 18, 1986. That valve also utilizes a modulator or solenoid 24 which controls hydraulic fluid flow from a pump 11. Pressure from the fluid allowed into chamber 36 by plunger 28 moves a spool valve 50 into a position in which the fluid can be supplied to a device requiring a controlled pressure.

In addition to the Knutson and Janecke devices, an earlier generation of the present invention used a similar configuration and operation. Several differences noted below exist between that valve and the other designs. It is known in the art that a solenoid can be used to control the opening and closing of a valve by magnetically moving a disc covering an aperture away from that aperture against a force from a spring or other biasing element. The magnetic attraction can be created by a fixed solenoid which generates a magnetic field. Problems occur with the movement of the disc portion of the valve due to residual magnetism after the solenoid field is turned off. Furthermore, the natural adhesion that occurs between solid planar surfaces and fluids can prevent ideal operation of the valve, especially in cold weather. In addition, the characteristics of the magnetic field were unable to be changed in such prior generation valve and no adjustment of performance specifications of the disc movement and output characteristics of the valve were possible. The present invention has greatly minimized the problems encountered in construction and operation of such valves.

OBJECTS AND SUMMARY OF THE INVENTION

It is an object of the present invention to provide an improved hydraulic modulating pressure control valve that may be adjusted to perform according to the desired output characteristics of the valve.

It is another object of the present invention to provide a hydraulic modulating pressure control valve in which sticking of the modulating element due to residual magnetism and natural adhesion due to oil viscosity sensitivity are greatly reduced.

It is a different object of the present invention to provide a new process by which a hydraulic modulating pressure control valve may be assembled more quickly and economically and with greater accuracy and precision.

Yet another object of the present invention is to provide a method by which the performance specifications of a hydraulic modulating pressure control valve may be adjusted during final assembly of the valve.

Still another object of the present invention is to provide an economical and efficient mechanism assembly of a hydraulic modulating pressure control valve.

How these and further objects of the invention are accomplished will be described by reference to the following description of a preferred embodiment of the invention taken in conjunction with the FIGURES. Generally, however, the objects are accomplished in a hydraulic modulating pressure control valve having a solenoid upper section below which is a conduit valving mechanism. Between the solenoid and the valving mechanism is a disc armature biased away from a solenoid by a wave spring and into sealing relation with the lower valving mechanism. When the solenoid is energized, the armature is drawn toward the solenoid against the bias of the spring, thereby opening the valving mechanism. The disc armature has been improved by dimpling to prevent sticking to the solenoid due to residual magnetism and the natural adhesion which occurs between solid planar surfaces in the presence of liquids due to viscosity sensitivity. The valve has been further improved in that the solenoid may be adjusted to alter the magnetic field characteristics, such as the reluctance caused by an air gap, which affect the operation of the valve when modulation is used. Adjustment is accomplished by axially moving the center pole of the solenoid during final assembly.

Additionally, a new method for assembling the valve is disclosed. The system uses feedback air pressure to measure the space between the disc armature and the valving mechanism before final attachment of the lower valving mechanism to the upper solenoid section. The new method and the hydraulic/pneumatic/electrical circuitry used provide a faster and more economical way of assembling valves and a means for "customizing" the performance characteristics of the valve.

Other variations and modifications of the invention will become apparent to those skilled in the art after reading this specification and are deemed to fall within the scope of the present invention if they fall within the scope of the claims which follow the description of the preferred embodiment.

DESCRIPTION OF THE DRAWINGS

FIG. 1 is a cross-sectional plan view of the finally assembled valve of the present invention.

FIG. 2A is a top view of the improved disc armature of the present invention.

FIG. 2B is a cross-sectional view of the disc armature of FIG. 2A taken along the line 2B—2B.

FIG. 2C is a cross-sectional view of a dimple in the disc armature of FIG. 2A taken along the line 2C—2C.

In FIG. 3, hydraulic and pneumatic connections or lines are shown in full lines while electrical connections or lines are shown in dot-and-dash lines.

In the FIGURES, like reference numerals refer to like elements.

DETAILED DESCRIPTION OF THE PREFERRED EMBODIMENT

1. General Configuration

Figure 3:
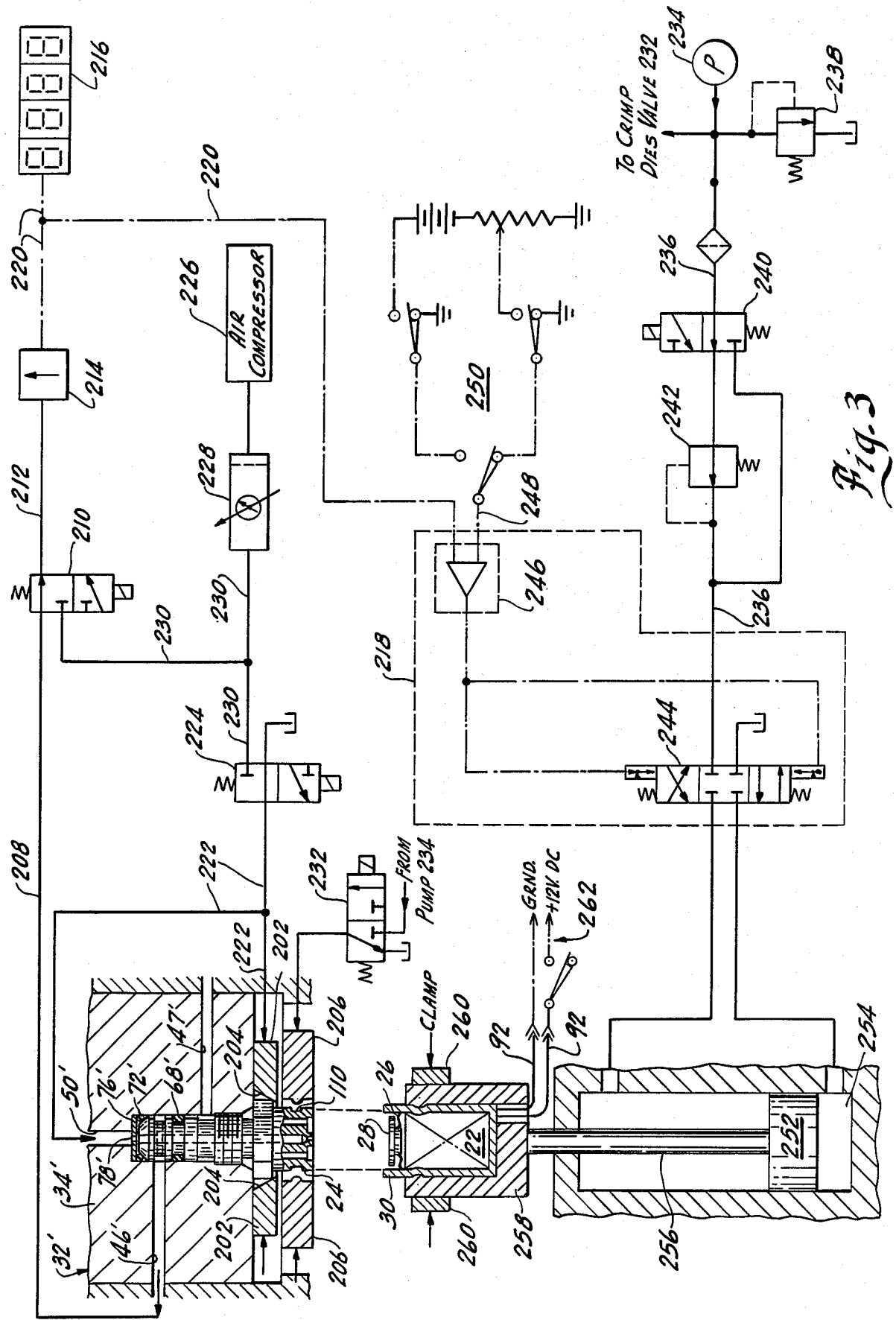
FIG. 3 is a schematic of the circuitry and mechanisms used to assemble the valve of the present invention.

Referring now to FIG. 1, a hydraulic pressure control valve 20 according to the preferred embodiment of the present invention is shown. It consists of a solenoid assembly 22 and body member 24. At the interface of assembly 22 and member 24 are a wave spring 26 and a disc armature 28 which is of improved construction over the prior art. Assembly 22, member 24, spring 26 and disc armature 28 are held in a predetermined configuration by outer tube 30.

In FIG. 1, valve 20 is shown mounted to a generic hydraulic mounting 32 having a main body 34 with a central bore 36 into which body member 24 may be threaded. Valve 20 is sealed to mounting 32 with an O-ring 38. Mounting 32 has an inlet port 40 which may be attached to a pump 42 designed to deliver fluid from a tank 44. An outlet port 46 is located parallel to and adjacent inlet port 40, though relative location of the ports is a mater of design choice and convenience. Outlet port 46 is designed to deliver fluid (under certain conditions described below) to the device 48 to be controlled by valve 20. Finally, mounting 32 has an exhaust port 50 which is generally coaxial with bore 36 and provides a path for fluid returning to tank 44.

Body member 24 is fitted into mounting 32 in a manner which allows fluid to be delivered to outlet port 46 under preselected conditions. Member 24 serves primarily therefore as a conduit with a built in control nozzle. The main body 52 is generally cylindrical and has a central coaxial bore 54 extending for its entire length. Bore 54 is of uniform diameter, except that it narrows considerably at the top of member 24, thus forming a relatively small nozzle 56.

Surrounding, but radially spaced apart from nozzle 56 is a concentric annular space 58 formed at upper surface 60 of member 24. Two passageways 62 connect annular space 58 to a second annular space 64. As seen in FIG. 1, when valve 20 is mounted in mounting 32, annular space 64 permits fluid communication between upper annular space 58 and inlet port 40. In a similar manner, cross-bore 66, which crosses through central bore 54 of member 24, permits fluid communication between nozzle 56 and outlet port 46.

In the preferred embodiment, fluid communication (leaking) between inlet port 40 and outlet port 46 is prevented by O-ring 68 located in a third annular space 70 and sealing the surface of bore 36 and member 24 when properly fitted. Similarly, fluid communication (leaking) between outlet port 46 and exhaust port 50 is prevented by another O-ring 72. The bottom beveled surface 74 of member 24 is sealed by O-ring 72 to bore 36 of mounting 32. A washer 76 situated between the bottom surface 80 of member 24 and the bottom of bore 36 has a reduced orifice 78 so that it acts as a fixed restriction in series with variable nozzle 56 for fluid under pressure in bore 54, thereby meteringly returning fluid to tank 44. Orifice 78 will have a predetermined size which is dictated by whatever output characteristics are desired in the operation of valve 20.

Communication between nozzle 56 and upper annular space 58 is controlled by disc armature 28. When in its closed position, as seen in FIG. 1, armature 28 seals any connection between nozzle 56 and space 58. When in its raised position, fluid from pump 42 flows via port 40 through passageways 62 and the space formed below the bottom surface 60 and armature 28 and thereafter into nozzle 56. Movement of armature 28 is controlled alternately by both wave spring 26 when the valve 20 is de-energized and coil assembly 22 when valve 20 is energized by a pulse generator 90.

Generally, solenoid assembly 22 is mounted above member 24. Assembly 22 consists of a center pole 84 about which a coil 86 is encapsulated in a two-part plastic annular casing 88 which surrounds a major portion of the longitudinal center of center pole 84. Coil 86 is connected by leads 92 to pulse modulator 90 which is designed to alternatively energize and de-energize coil 86. Above coil 86 is an end plate 94 which, in connection with tube 30, will hold the solenoid assembly 22 in a compressed configuration to be described in more detail below. End plate 94 is annular so as to allow center pole 84 to pass and be movable therethrough during assembly. Immediately below the coil 86 is an annular outer pole 96, the bottom surface of which holds the upper surface of wave spring 26. To seal and protect the coil 86 and its casing 88 from pressurized fluid, an O-ring 98 is compressed between outer pole 96, center pole 84 and coil casing 88. Within this solenoid assembly 22, center pole 84 is held firmly in an interference fit, yet movably during assembly, so that it can be axially adjusted.

The entire assembly of valve 20 and solenoid assembly 22 is held in proper orientation by outer tube 30. A first crimp 100 impinges on annular space 102 of outer pole 96 and holds it immobile with a mechanical seal. In order to hold the solenoid assembly 22 in correct compressed orientation, a second crimp 104 impinges and holds end plate 94 along a stepped outer surface 106. Finally, a third crimp 108 impinges on outer annular space 110 of body 52. The orientation of member 24 to the remainder of valve 20 is particularly important and is accomplished by a process described below.

2. Operation And Center Pole Adjustment To Set Performance Levels

Operation of the valve will now be explained in connection with the general configuration discussed above. For purposes of this explanation, it will be assumed that the valve 20 is employed to control a hydraulic device 48 requiring a controlled pressure which may be selectively changed. Valve 20 is used in this application to provide a regulated flow on demand to hydraulic device 48.

In its initial position seen in FIG. 1, i.e. when no modulated pressure is present, the wave spring 26 along with fluid pressure on the upper surface of disc 28 will bias disc armature 28 toward the nozzle 56 and close off fluid communication between the nozzle 56 and the annular space 58. Outlet port 46 communicates with exhaust port 50 and tank 44 due to the flow path created through cross-bore 66 and orifice 78. When it is desired to supply the device 48 with additional hydraulic pressure, modulator 90 will periodically energize the coil 86 thereby lifting the armature 28 by magnetic attraction. While armature 28 is in a raised position, fluid will flow through nozzle 56 and provide fluid to outlet port 46. When the coil 86 is de-energized, the disc armature 28 is then allowed to return to its initial closed position under the spring force of wave spring 26, thereby sealing inlet 40 from outlet 46. In past experience, problems with sticking of armature 28 to the solenoid assembly 22 were encountered. This sticking is due, among other things, to the residual magnetism between the disc 28 and outer pole 96 and the fluid-solid adhesive effect occurring naturally between the disc 28 and outer pole 84 when oil viscosity increases. Disc armature 28 has now been improved so as to avoid this sticking problem.

As seen in FIG. 2A, disc armature 28 is composed of a primary disc portion with an annular ledge 23 around the lower portion of the disc 28. Above this ledge 23 is a reduced circumferential surface 25, the purpose of ledge 23 and surface 25 being explained below. Disc 28 has an upper surface 27 seen in FIG. 2B having two holes 29 diametrically opposed, extending completely through disc 28 and normal to surface 27 in the preferred embodiment and a plurality of dimples 112 space about the surface 27. As seen in FIG. 2C, each dimple 112 has a recessed portion 114 and a raised lip 116 about its periphery. In the preferred embodiment, three dimples 112 are equidistantly spaced near the edge of surface 27.

At least three dimples 112 are required to minimize cocking of the disc 28 during axial displacement toward and away from solenoid 22. The specific dimensions of the recess 114 and lip 116 of each dimple 112 are a matter of design choice dictated by the desired output characteristics of the valve 20. It is sufficient to note that the dimples maintain adequate clearance between solenoid assembly 22 and armature 28 to minimize sticking due to residual magnetism, collected dirt and the adhesive effect naturally occurring between fluids and solids.

The actual functioning of disc armature 28 is controlled in part by the interaction between it and the magnetic pole induced by coil 86. The specific performance characteristics vary depending on the intended use, the type of input signals used with modulator 90 and other selected criteria. To permit customization of the valve 20 for different uses, center pole 84 is axially movable after assembly, i.e. final crimping.

More specifically, the center pole adjustment allows the pressure gain to be shifted on the input axis of the curve to within 25% of the total rated input signal. A specific control pressure may be adjusted to a specific input signal within a 25% input range by positioning the center pole 84 closer to the axial level of the outer pole 96 which limits the maximum axial displacement of armature 28. When the solenoid 22 is assembled, the center pole 84 is positioned axially further away from the armature 28 than the outer pole 96. This creates a weaker electro-magnetic field because it produces a larger reluctance (gap 83) in the circuit formed when coil 86 is energized. If the center pole 84 is moved closer to the level of the outer pole 96, the magnetic force is increased. At a given input signal, as the magnetic field is increased the control (output) pressure is likewise increased. So for a given pulse-width signal at a fixed frequency, the solenoid 22 will pull in sooner when the center pole 84 is moved towards the armature 28 during its original assembly. If solenoid 22 pulls in sooner, it will create a shift in the pressure gain curve so that the curve will be generated within a lesser pulse width signal range. Therefore, at a specific pulse width signal, a control pressure may be adjusted for a number of valves to be at the same level. This is an important feature, especially when applied to two-stage control valves which all must come out of deadband at the same input signal to make it simple to interface with electronic controls.

3. Assembly Process

The general assembly process begins with the formation of the solenoid assembly 22. The coil 86 is encapsulated in plastic casing 88 in the preferred embodiment so that the coil compression is approximately 350 pounds. This can be accomplished by processes well known to those of ordinary skill in the art using any suitable plastic material that is capable of withstanding the thermal expansion and contraction encountered in normal operation of the valve 20. In the preferred embodiment, the center pole 84 is pressed into end plate 94 in such a way that the lower end of center pole 84 is axially displaced about 0.010 inch from the lower face 118 of outer pole 96.

At the opposite end of the solenoid assembly 22, a first crimp 104 holds end plate 94 by virtue of the stepped surface 106 thereabout. Outer tube 30, which in the preferred embodiment is a seamless steel tube, extends beyond end plate 94 a small distance so that a cap 120 made of an appropriate plastic material can be placed over the center pole 84 and end plate 94. The leads 92 extend through and out of end plate 94 and cap 120. When the upper end of the solenoid 22 is completed, the lower end which includes outer pole 96 must be securely fastened.

The O-ring 98 is placed around center pole 84 and is compressed against casing 88 by outer pole 96 thereby creating a fluid-tight seal for the casing 88 and coil 86. This is done during a final coil compression step in which the elements of the solenoid assembly 22 are compressed upwardly against the end plate 94. While all parts are under compression, the outer tube 30 is fastened, secured and sealed to the outer pole 96. This sealed crimp 100, in the preferred embodiment, must withstand 3000 psi of continuous fluid pressure without leaking.

During final valve assembly, the lower valve body 52 must be fastened, secured and sealed to the outer tube 30 with the resulting crimp 108 also preferably being able to withstand continuous fluid pressure of 3000 psi. During the final assembly, the lower valve body 52 must be positioned away from the outer pole 96 to allow the armature gap 83 to be set. In the preferred embodiment, the armature 28 must be free to move axially between the lower body 52 and the outer pole 96 with an average 0.008 inch stroke which is opposed in one direction by the wave spring 26. The improvement in the assembly process is at this stage—final valve assembly—in that the new method is faster and allows the manufacturer to use simplified parts with a resulting substantial improvement in accuracy of operation.

All three of the crimps 100, 104, 108 are single crimps formed by a three-section die. This die forms a continuous crimp around the entire circumference of the outer tube 30. After the solenoid assembly 22 is made, the armature 28 and wave spring 26 are added after which the lower body 52 is positioned and sealed into place in the manner hereinafter described.

As seen in FIG. 3, a separate circuit 200 has been designed to simulate operating conditions of the valve 20 during final valve assembly. Initially, lower valve body 24 is mounted onto assembly mounting 32' which is generally similar to mounting 32 of FIG. 1. Mounting 32' has a main body portion 34'. Connected to center bore 54 of body member 24 is a supply port 50'. Additionally, a control port 46' is connected to cross-bore 66. Annular space 64 is vented to atmosphere through bore 47' so that exhaust air passes out. An O-ring 72' between the valve and orifice plate 76' prevents leaking between ports 46' and 50'. Another O-ring 68' prevents leakage between ports 46' and 47'.

Body member 24 is held immobile by jaws 202 which engage member 24 with angled inner surfaces 204 and thus prevent axial displacement of the member 24 during final valve assembly. Immediately adjacent jaws 202 are crimping dies 206 whose precise functioning will be explained in more detail below. These dies 206 are capable of forming the continuous crimp 108 which holds outer tube 30 (and solenoid assembly 22) to the tooled annular space 110 in member 24.

It should be noted that in circuit 200 and other similar schematics, pneumatic and/or hydraulic lines are solid while electrical connections are shown in dot-and-dash lines. Control port 46' connects cross-bore 66 via line 208 to an air transducer 214 which converts the perceived pressure into a proportional electrical signal representing the pressure feedback from valve 20 which is fed to both a digital readout 216 and actuator servo-control element 218 through line 220.

Supply port 50' and jaws 202 receive pressure via line 222 from air valve 224 under conditions to be described below. Pressure is generated at air compressor 226, sent through a combined air filter, regulator and lubricator 228 and thereafter supplied to valve 224 via line 230. Air from inlet port 40 is vented during assembly to atmosphere through exhaust port 47'.

Hydraulic pressure for crimping dies 206 is supplied through valve 232 from pump 234. Pump 234 also supplies hydraulic pressure to servo valve 244 via line 236. A relief valve 238, which in the preferred embodiment is capable of releasing 2000 psi, may be used to bleed off a portion of the pressure in line 236. Also, because circuit 200 may alternately be used to form the preliminary crimps 100, 104 or final crimp 108, a selection valve 240 is available with a reducer 242 to selectively change the pressure supplied to element 218.

Control element 218 is composed of a three position, four-way servo valve 244 controlled by comparator 246. Comparator 246 receives its feedback signal from line 220 and its reference signal, or setpoint from line 248 and setpoint generator 250. Generator 250, like selection valve 240, has alternate settings depending on whether a preliminary coil crimp 100, 104 or final crimp 108 is being formed. Four-way valve 244 varies the positioning of piston 252 in actuator 254. Connected to piston 252 is a rod 256 on which is mounted a coil mounting 258. Clamps 260 on mounting 258 hold the solenoid assembly 22 firmly in place. Leads 92 are hooked to a switched voltage source 262 to selectively energize the coil 86.

Operation of circuit 200 in performing final valve assembly can now be explained. Initially, a lower body member 24 is mounted in assembly mounting 32' as shown. Likewise, solenoid assembly 22 is properly set in coil mounting 258. Voltage is applied to the coil 86 and the wave spring 26 is centered thereon. Centering can be accomplished by visual inspection since, in the preferred embodiment, outer pole 96 has an internal groove 97 whose inner diameter matches closely the outer circumference 33 of wave spring 26 to hold it in place. In a similar fashion, disc armature 28 is magnetically fastened to outer pole 96 with wave spring 26 compressed between disc 28 and outer pole 96. Disc 28 has circumferential surface 25 closely matching the inner diameter 31 of wave spring 26 so that disc 28 is held within and to spring 26. Solenoid assembly 22, disc armature 28 and spring 26 are now in their second position of FIG. 3, thus duplicating an open valve condition.

Initially, for final crimping, valve 224 closes to line 230 while valve 210 opens to it and permits transducer 214 to get a supply pressure reading. Also, setpoint generator 250 and valve 240 are set for final crimping. Then valve 10 closes to line 230 while valve 224 opens thereto, locking jaws 202 and applying a known pressure through fixed orifice 78' (see FIG. 3) in supply port 50'. The air in port 50' passes up center bore 54 and through nozzle 56 while the resultant pressure of the air goes to transducer 214 via port 46', valve 210 and lines 208, 212. This resultant pressure is produced between fixed orifice 78' and nozzle 56. This is the control pressure.

The control pressure measured by transducer 214 is a function of the resistance encountered at nozzle 56. This resistance in turn is a function of the separation between disc 28 and nozzle 56 when they are in close axial proximity. Excess air from nozzle 56 is vented through the separation of nozzle 56 and disc 28 and through exhaust port 47'. Transducer 214 and digital readout 216 translate the feedback pressure in line 212 into a digital readout of the separation. This electrical signal is also sent to comparator 246 where it is compared to the setpoint from generator 250. Valve 244 is adjusted to move assembly 22 closer, further or hold it in place if the reference and feedback signals match.

When the two signals match, valve 232 switches to close crimp dies 206 and seal solenoid assembly 22 to body member 24. In the preferred embodiment, the average displacement for the disc armature 28 from outer pole 96 is 0.008 inches. The above assembly method provides accuracy of ±0.0002 inches.

While one preferred circuit is shown in FIG. 3, others could be substituted therefore by one skilled in the art after the objects of the assembly technique are understood. Accordingly, the present invention is not to be limited to the specifically disclosed preferred embodiment, but rather only by the scope of the claims which follow.

What is claimed is:
1. A modulating hydraulic pressure control valve comprising:
   (a) a cylindrical sleeve;
   (b) a solenoid in said sleeve having:
      a center pole;
      an annular outer pole surrounding the lower portion of said center pole;
      a winding of wire substantially surrounding the portion of said center pole above said outer pole;
      a power source connected to said winding capable of supplying an electrical current to said winding such that a magnetic field is induced in said center pole and said outer pole by the current in said winding;
      an annular end cap above said winding; and
      wherein said solenoid has a generally planar lower face;
   (c) a valving element in said sleeve and spaced apart from said solenoid, said valving element including:
      a generally cylindrical body portion having an upper generally circular face;

said upper face of said valving element defining a chamber with said sleeve and said lower face of said solenoid;

an outlet port extending from said chamber through said body portion;

a plurality of inlet ports extending to said chamber through said body portion and adjacent said outlet port, said inlet ports admitting hydraulic fluid under pressure to said chamber;

an exhaust port connected to said outlet port;

(d) control means within said chamber, said control means including:

an armature movable between a first sealing position and a second open position, such that when said armature is in said first position, communication between said inlet and outlet ports is prevented and said armature is in contact with said upper face; and when said armature is in said second position, communication between said inlet and outlet ports is permitted and said armature is spaced apart from said upper face;

means biasing said armature in said first position whenever said solenoid is de-energized;

(e) wherein said center pole is axially movable so that when an electrical current energizes said winding, the magnetic reluctance created thereby between said armature and said solenoid may be adjusted, therefore controlling the level of magnetic saturation for the materials in use.

2. The modulating hydraulic pressure control valve of claim 1 wherein said armature is a disc oriented so that said outlet port is sealed at said upper face when said armature is in said first position.

3. The modulating hydraulic pressure control valve of claim 1 wherein said biasing means is an annular wave spring between said disc armature and said outer pole.

4. The modulating hydraulic pressure control valve of claim 1 wherein said valve further comprises means for sealing said winding from fluid in said outlet or inlet ports while permitting said center pole to pass through said sealing means.

5. The modulating hydraulic pressure control valve of claim 2 wherein said disc has a plurality of holes therethrough such that fluid in said chamber assists in maintaining said armature is in said first postion.

6. A modulating hydraulic pressure control valve comprising:

(a) a cylindrical sleeve;

(b) a solenoid in said sleeve having:

a pole, including an annual outer pole segment;

a winding of wire substantially surrounding said pole;

a power source connected to said winding capable of supplying an electrical current to said winding such that a magnetic field is induced in said pole by the current in said winding; and wherein said solenoid has a lower face;

(c) a valving element spaced apart from said solenoid, said valving element including:

a generally circular body portion having an upper generally circular face;

said upper face of said valving element defining a chamber with said sleeve and said lower face of said solenoid;

an outlet port extending from said chamber through said body portion;

a plurality of inlet ports extending to said chamber through said body portion and adjacent said outlet port, said inlet ports admitting hydraulic fluid under pressure to said chamber;

an exhaust port connected to said outlet port;

(d) control means within said chamber, said control means including:

a disc armature movable between a first sealing position and a second position, such that when said armature is in said first position, communication between said inlet outlet ports is prevented and said armature is in contact with said upper face; and when said armature is in said second position, communication between said inlet and outlet ports is permitted and said armature is spaced apart from said upper face, said armature having:

a first face designed to prevent fluid communication between said inlet and outlet ports when said disc is in said first position;

a second face designed to contact only said outer pole segment when said disc is in said second position; and wherein said second face has at least three spaced dimples thereon, each of said dimples having a recessed portion and a raised circumferential lip therearound; and means biasing said armature in said first position whenever said solenoid is de-energized.

7. The modulating hydraulic pressure control valve of claim 6 wherein said armature is oriented so that said outlet port is sealed at said upper face when said armature is in said first position.

8. The modulating hydraulic pressure control valve of claim 6 wherein said biasing means is an annular wave spring between said disc armature and said outer pole segment.

9. The modulating hydraulic pressure control valve of claim 6 wherein said valve further comprises means for sealing said winding from fluid in said chamber.

10. The modulating hydraulic pressure control valve of claim 6 wherein said armature has a hole therethrough so that fluid in said chamber, when said armature is in said first position, applies pressure equally to said armature to balance pressure forces during rapid dynamic movement.

11. A method for presetting the operating characteristics of a modulating hydraulic pressure control valve, said method comprising:

(a) providing a modulating hydraulic pressure control valve including:

a cylindrical sleeve;

a solenoid, in said sleeve, having a center pole and a power source connected to said solenoid capable of supplying an electrical current so that a magnetic field is induced in said center pole;

a valving element in said sleeve spaced apart from said solenoid, said valving element including a fluid pressure source and a generally cylindrical body portion having an upper generally circular face, said upper face defining a chamber with said sleeve and said lower face of said solenoid;

an armature within said chamber, movable between a first sealing position and a second opening position;

means biasing said armature in said first position whenever said solenoid is de-energized;

(b) energizing said solenoid means;

(c) measuring the magnetic reluctance created between said armature means and said solenoid means when said solenoid means is energized;

(d) axially moving said center pole to achieve a preselected magnetic reluctance between said solenoid and said armature means when said solenoid means is energized.

12. A modulating hydraulic pressure control valve comprising:

(a) a cylindrical sleeve;

(b) a solenoid in said sleeve having:
  a center pole;
  an annular outer pole surrounding the lower portion of said center pole;
  a winding of wire substantially surrounding the portion of said center pole above said outer pole;
  a power source connected to said winding capable of supplying an electrical current to said winding such that a magnetic field is induced in said center pole and said outer pole by the current in said winding; an annular end cap above said winding; and wherein said solenoid has a generally circular lower face;

(c) a valving element in said sleeve and spaced apart from said solenoid, said valving element including:
  a generally cylindrical body portion having an upper generally circular face;
  said upper face of said valving element defining a chamber with said sleeve and said lower face of said solenoid;
  an outlet port extending from said chamber through said body portion;
  a plurality of inlet ports extending to said chamber through said body portion and adjacent said outlet port, said inlet ports admitting hydraulic fluid under pressure to said chamber;
  an exhaust port connected to said outlet port;

(d) control means within said chamber, said control means including:
  a disc armature movable between a first sealing position and a second opening position, such that when said armature is in said first position, communication between said inlet and outlet ports is prevented and said armature is in contact with said upper face; and when said armature is in said second position, communication between said inlet and outlet ports is permitted and said armature is spaced apart from said upper face, said armature having:
    a first face designed to seal fluid communication between said inlet and outlet ports when said disc is in said first position;
    a second face designed to contact said outer and center poles when said disc is in said second position; and
    wherein said second face has at least three dimples thereon, each of said dimples having a recessed portion and a raised circumferential lip therearound;
  means biasing armature in said first position whenever said solenoid is de-energized;

(e) wherein said center cylindrical pole is axially movable so that when an electrical current energizes said winding, the magnetic reluctance created thereby between said armature and said solenoid may be adjusted.

13. The modulating hydraulic pressure control valve of claim 12 wherein said armature is oriented so that said outlet port is sealed at said upper face when said armature is in said first position.

14. The modulating hydraulic pressure control valve of claim 12 wherein said biasing means is an annular wave spring between said disc armature and said outer pole.

15. The modulating hydraulic pressure control valve of claim 12 wherein said valve further comprises means for sealing said winding from fluid in said chamber.

16. The modulating hydraulic pressure control valve of claim 12 wherein said armature has a hole therethrough so that fluid in said chamber, when said armature is in said first position, applies pressure to said armature to assist in maintaining said first position.

17. A system for assembling modulating hydraulic pressure control valves by sealing components thereof into a cylindrical tube, said system comprising:

(a) a hydraulic pressure control valve including:
  solenoid means having a lower face and armature means magnetically attached to said face;
  a generally cylindrical valving element comprising a central longitudinal passageway having a first end and a second end; a port intermediate the ends of said central passageway; said valving element having a face through which said first end passes;

(b) means for holding said solenoid means and said valving element in a spaced apart relation within said tube;

(c) pressure supply means designed to provide a known air pressure to a fixed orifice at said second end of said passageway of said valving element;

(d) means for measuring the resultant pressure of air at said port, the resultant pressure at said port being indicative of the pressure drop created at said first end which is proportional to the proximity of said armature means attached to said solenoid;

(e) means for axially moving said solenoid and said valving element within said tube a known distance relative to one another based on the resultant pressure at said port; and (f) means for sealing and fastening said solenoid, said armature means and said valving element in said tube and in a known spaced apart relation.

18. The system as recited in claim 17 wherein said sealing means is a plurality of jaws for crimping said tube into sealing and fastening engagement with said solenoid and said valving element.

19. The system as recited in claim 18 wherein said sealing means comprises three of said jaws.

20. The system as recited in claim 17 wherein said measuring means is an air transducer designed to measure the resultant air pressure at said port and to thereafter generate an electrical signal proportional thereto; said electrical signal being used to control said moving means.

21. The system as recited in claim 20 wherein said moving means is a hydraulically operated servo positioning cylinder having a piston therein and a rod having an inner end attached to said piston; a clamp being secured to the outer end of said rod and adapted to hold said solenoid and move said solenoid axially in response to the distance of said solenoid from said valving element as determined by said measuring means.

22. A method for assembling modulating hydraulic pressure control valves by sealing and securing components thereof into a cylindrical tube, said method comprising:

(a) providing a hydraulic pressure control valve including:
   an energized solenoid having a face plate and an armature magnetically attracted toward said face plate;
   a generally cylindrical valving element comprising a central longitudinal passageway, having a first end and a second end; a port intermediate the ends of said central passageway; said valving element having a generally circular face at the first end of said passageway;
(b) holding said solenoid means and said valving element in a spaced apart relation within said tube;
(c) supplying a known air pressure to a fixed orifice at said second end of said passageway of said valving element;
(d) measuring the resultant pressure at said port, the resultant pressure at said port being indicative of the pressure drop created at said first end which is proportional to the proximity of said armature to said solenoid;
(e) axially moving said solenoid and said valving element within said tube based on the resultant pressure at said port; and
(f) sealing and securing said solenoid, said armature means and said valving element in said tube and in a known spaced apart relation.

23. The method of claim 22 wherein said sealing and fastening is accomplished by a plurality of jaws crimping said tube into sealing engagement with said solenoid and said valving element.

24. The method of claim 23 wherein three of said jaws are used for sealing.

25. The method of claim 22 wherein said measuring is accomplished by an air transducer, said transducer generating an electrical signal proportional to the air pressure at said port; said electrical signal controlling said moving means.

26. The method of claim 25 wherein said moving is accomplished by a hydraulically operated, servo positioning cylinder having a piston therein and a rod having an inner end attached to said piston; securing a clamp to the outer end of said rod and holding said solenoid while moving said solenoid axially in response to the feedback signal generated by said transducer.

* * * * *